(12) United States Patent
Kegeler et al.

(10) Patent No.: US 6,802,994 B1
(45) Date of Patent: Oct. 12, 2004

(54) FIRE RETARDANT COMPOSITIONS CONTAINING AMMONIUM POLYPHOSPHATE AND IRON ADDITIVES FOR CORROSION INHIBITION

(75) Inventors: Gary H. Kegeler, Diamond Bar, CA (US); Howard L. Vandersall, Upland, CA (US)

(73) Assignee: Astaris LLC, St. Louis, MO (US)

( * ) Notice: Subject to any disclaimer, the term of this patent is extended or adjusted under 35 U.S.C. 154(b) by 0 days.

(21) Appl. No.: 09/723,567

(22) Filed: Nov. 28, 2000

(51) Int. Cl.$^7$ .................. C09K 21/04; C09K 21/02; C09K 21/10

(52) U.S. Cl. .................. 252/603; 252/607; 106/18.11; 106/18.28

(58) Field of Search ................ 252/603, 607; 106/18.11, 18.28

(56) References Cited

U.S. PATENT DOCUMENTS

| | | |
|---|---|---|
| 3,007,879 A | 11/1961 | Jordan |
| 3,196,108 A | 7/1965 | Nelson |
| 3,214,372 A | 10/1965 | Lobos |
| 3,223,649 A | 12/1965 | Langguth |
| 3,245,905 A | 4/1966 | Young |
| 3,257,316 A | 6/1966 | Langguth et al. |
| 3,275,566 A | 9/1966 | Langguth |
| 3,293,189 A | 12/1966 | Morgenthaler |
| 3,309,324 A | 3/1967 | Langguth et al. |
| 3,338,829 A | 8/1967 | Langguth et al. |
| 3,342,749 A | 9/1967 | Handleman et al. |
| 3,350,305 A | 10/1967 | Langguth et al. |
| 3,354,084 A | 11/1967 | Katzer |
| 3,364,149 A | 1/1968 | Morgenthaler |
| 3,409,550 A | 11/1968 | Gould |
| 3,625,716 A | 12/1971 | King et al. |
| 3,634,234 A | 1/1972 | Morgenthaler |
| 3,714,066 A | 1/1973 | King et al. |
| 3,730,890 A | 5/1973 | Nelson .................. 252/7 |
| 3,955,987 A | 5/1976 | Schaar et al. |
| 3,960,735 A | 6/1976 | Lacey .................. 252/2 |
| 4,101,485 A | 7/1978 | Brooks et al. |
| 4,145,296 A | 3/1979 | Fox et al. |
| 4,168,239 A | 9/1979 | Mertz et al. |
| 4,194,979 A | 3/1980 | Gottschal |
| 4,247,435 A | 1/1981 | Kasten |
| 4,272,414 A | 6/1981 | Vandersall |
| 4,442,157 A | 4/1984 | Marx et al. |
| 4,447,336 A | 5/1984 | Vandersall |
| 4,447,337 A | 5/1984 | Adl et al. |
| 4,448,841 A | 5/1984 | Glass et al. |
| 4,459,213 A | 7/1984 | Uchida et al. |
| 4,588,510 A | 5/1986 | Salyer et al. |
| 4,606,831 A | 8/1986 | Kegeler et al. |
| 4,652,383 A | 3/1987 | Tarpley, Jr. et al. |
| 4,717,509 A | 1/1988 | Buttgens et al. |
| 4,770,794 A | 9/1988 | Cundasawmy et al. |
| 4,822,524 A | 4/1989 | Strickland |
| 4,839,065 A | 6/1989 | Vandersall .................. 252/603 |

(List continued on next page.)

FOREIGN PATENT DOCUMENTS

| | | | |
|---|---|---|---|
| DE | 3716304 | 11/1988 | |
| DE | 4343728 | 6/1995 | |
| EP | 00277932 B1 | 3/1992 | |
| EP | 00277932 A1 | 3/1992 | |
| EP | 0693304 B1 | 1/1996 | |
| EP | 0693304 A1 | 1/1996 | |
| EP | 06693304 | * 1/1996 | |
| EP | 0911067 A2 | 4/1999 | |
| EP | 0911067 A3 | 4/1999 | |
| EP | 0 911 067 A2 A3 | 4/1999 | |
| GB | 2013168 | 8/1979 | ........... C23F/11/18 |
| GB | 2234501 | 2/1991 | |
| GB | 2301122 | 11/1996 | |
| WO | WO 93/22000 | 11/1993 | |

OTHER PUBLICATIONS

Specification 5100—304b (Jul., 1999) Superceeding Specification 5100–00304a (Feb., 1986), entitled Specification for Long Term Retarndant, Wildland Fire, Aircraft or Ground Application.

(List continued on next page.)

Primary Examiner—Cephia D. Toomer
(74) Attorney, Agent, or Firm—Thompson Coburn LLP

(57) ABSTRACT

Corrosion-inhibited fire retardant compositions and methods of making and using the same are provided. The corrosion-inhibited fire retardant compositions are comprised of at least one fire retardant component, a suspending agent, and a corrosion inhibiting system. The corrosion inhibiting system is comprised of at least one corrosion inhibiting compound selected from a group of compounds including azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof. The corrosion inhibiting system is typically present in the fire retardant composition of the invention in a minor amount effective to substantially reduce corrosiveness of the concentrated fire retardant composition and of its diluted solution. Methods of using the corrosion inhibiting system and corrosion-inhibited agricultural plant nutrients are also provided.

39 Claims, No Drawings

U.S. PATENT DOCUMENTS

| | | | |
|---|---|---|---|
| 4,908,160 A | 3/1990 | Thacker | |
| 4,971,728 A | 11/1990 | Vandersall | |
| 4,978,460 A | 12/1990 | Von Blucher et al. | |
| 4,983,065 A | 1/1991 | Vandersall | |
| 4,983,326 A | 1/1991 | Vandersall | 252/603 |
| 5,091,097 A | 2/1992 | Pennartz | |
| 5,215,679 A | 6/1993 | Cramm et al. | |
| 5,294,664 A | 3/1994 | Morrison, Jr. et al. | |
| 5,788,915 A | 8/1998 | Blount | |
| 5,801,116 A | 9/1998 | Cottrell et al. | |
| 5,882,541 A | 3/1999 | Achtmann | |
| 5,958,117 A | 9/1999 | Crouch et al. | 106/18.11 |
| 5,969,011 A | 10/1999 | Frolich et al. | |
| 6,019,176 A | 2/2000 | Crouch | 169/46 |
| 6,054,515 A | 4/2000 | Blount | |
| 6,111,002 A | 8/2000 | Doring et al. | |
| 6,124,394 A | 9/2000 | Goto et al. | |
| 6,162,375 A | 12/2000 | Crouch et al. | |
| 6,235,347 B1 | 5/2001 | Arshinova et al. | |
| 6,322,726 B1 | 11/2001 | Vandersall et al. | |
| 6,323,263 B1 | 11/2001 | Kuwabawa et al. | |
| 6,352,786 B2 | 3/2002 | Arshinova et al. | |
| 6,447,697 B1 | 9/2002 | Vandersall et al. | |
| 6,517,747 B2 | 2/2003 | Vandersall et al. | |
| 6,611,832 B1 | 8/2003 | Jan van Lunteren | |
| 6,620,348 B1 | 9/2003 | Vandersall et al. | |
| 6,676,858 B2 | 1/2004 | Vandersall et al. | |
| 2002/0096668 A1 | 7/2002 | Vandersall et al. | |
| 2002/0100897 A1 | 8/2002 | Vandersall et al. | |
| 2003/0204004 A1 | 10/2003 | Vandersall et al. | |
| 2003/0212177 A1 | 11/2003 | Vandersall et al. | |

OTHER PUBLICATIONS

U.S. patent application Ser. No. 10/032,595, Vandersall et al., filed Dec. 26, 2001.

U.S. patent application Ser. No. 09/978,602, Vandersall et al., filed Oct. 16, 2001.

U.S. patent application Ser. No. 09/978,401, Vandersall et al., filed Oct. 16, 2001.

U.S. patent application Ser. No. 10/421,148, Vandersall et al., filed Apr. 23, 2003.

U.S. patent application Ser. No. 10/421,149, Vandersall et al., filed Apr. 23, 2003.

Database WPI Section Ch, Week 197949 Derwent Publications Ltd., London, GB; Class E37, AN 1979-88266B XP002212823 & JP 54 138060 A (Nippon Kodoshi Kogyo KK), Oct. 26, 1979 abstract.

Abstract of Chemical Week, (Mar. 28, 1979), p. 40.

Abstract of EP0659449 also published as DE 4343728 (Loenhert), Dec. 21, 1993.

Abstract of JP 54 138060 (Nippon Kodoshi Kogyo KK), Oct. 26, 1979.

Derwent Abstract WPI No. 73-76319U of FR 2172867 (1973).

Derwent Abstract WPI No. 80-77100C of BE 883892 (1980).

Derwent Abstract WPI No. 86-055675 of AU 8544579 (1986).

Derwent Abstract WPI No. 91-013530[02] of SU 1544450 (1991).

Derwent Abstract WPI No. 91-013531 of SU 154451 (1991).

Derwent Abstract WPI No. 95-198325 of RU 2022630 (1995).

English language abstract of Artsybashev, E.A., et al., Lesnoe Khozyaistvo, No. 12, pp. 43-44 (1991).

English language abstract of Artsybashev, E.S., et al., Lesnoe Khozyaistvo, No. 6, pp. 40-42 (1988).

English language abstract of Lorberbaum, V.G., et al., Lesnoe Khozyaistvo, No. 9, pp. 59-60 (1983).

English language abstract of Shchetinskii, E.A., et al., Lesnoe Khozaistvo, No. 5, p. 88 (1975).

George, C.W., et al., "Evaluation of Megatard 2700 A Proposed New Fire Retardant System", Intermountain Forest and Range Experimental Station, General Technical Report INT-112 (Aug. 1981).

Patton, Temple C., Pigment Handbook, vol. 1, Properties and Economics, pp. 323-347 Date unknown.

Technical Disclosure of physical properties from Day-Glo Color Corp at www.dayglo.com/DOCS/physprop.html (May 1995).

USDA Forest Service, entitled Specification For Long Term Retardant, Wildland Fire, Aircraft or Ground Application, Specification 5100-304b (Jan., 2000) Superceding Specification 5100-304b (Jul. 1999) Superceding Specification 5100-304a (Feb. 1986).

Vandersall, H.L., Air Attack: Retardants, Rheology and Some New Options, Int. J. Wildland Fire 4(1): 45-51, 1994, pp. 45-51.

Xantham Gum, Natural Biogum For Scientific Water Control, Fifth Edition, Kelco, Division of Merck & Co., Inc. Date unknown.

* cited by examiner

FIRE RETARDANT COMPOSITIONS CONTAINING AMMONIUM POLYPHOSPHATE AND IRON ADDITIVES FOR CORROSION INHIBITION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to corrosion-inhibited fire retardant compositions. More specifically, the invention is directed to ammonium polyphosphate concentrates and other solutions containing suspended and/or soluble iron compounds having a reduced corrosion tendency.

BACKGROUND

Aerial application of fire-retardant compositions to combat the spread of wildland fires is common. Fire retardant compositions designed for managing and controlling wildland fires are of two general types, dry-powdered concentrates that are mixed with water prior to use and concentrated liquids, which are diluted with water at the time of transfer to an application vehicle. Fire retardant concentrates that are supplied in the liquid form are preferred by some because they can be simply and easily diluted to end-use strength with little mixing hardware and manpower.

Ammonium polyphosphate liquids have been used as aerially applied fire-retardants. These liquids have certain advantages in comparison to other fire-suppressing compositions since they can be transported and stored prior to use in the liquid form rather than being mixed from dry ingredients. However, concentrated liquid fire retardants and solutions prepared therefrom are extremely corrosive to aluminum and brass and mildly corrosive to other materials of construction used in handling, storage and application equipment. As used herein, all metals include alloys thereof. Accordingly, aluminum includes aluminum 2024T3, 6061 and 7074, steel includes 1010 and 4130 steel and brass includes yellow and naval brass. Since wildland fire retardants are most frequently transported to the fire and applied aerially, it is imperative that corrosive damage to the materials of construction of fixed-wing aircraft and helicopters be minimized.

Accordingly, the United States Department of Agriculture ("USDA") Forest Service has established, in "Specification 5100-304b (July 1999) Superseding Specification 5100-00304a (February 1986)," entitled "Specification for Long Term Retardant, Wildland Fire, Aircraft or Ground Application" (hereinafter, "Forest Service Specifications"), hereby incorporated by reference in its entirety, maximum allowable corrosion rates for 2024T3 aluminum, 4130 steel, yellow brass and Az-31-B magnesium. For example, the corrosivity of forest fire retardants, in concentrate, to aluminum, steel, yellow brass and magnesium must not exceed 5.0 milli-inches ("mils") per year as determined by the "Uniform Corrosion" test set forth in Section 4.3.5.1 of the aforementioned USDA, Forest Service Specifications. The Forest Service Specifications identify the maximum amount of corrosion acceptable when both the retardant concentrate and its diluted solutions are exposed to each metal indicated above at temperatures of 70° Fahrenheit ("F") and 120° F. in both totally and partially immersed configurations. The maximum allowable corrosivity of aerially applied fire retardant diluted solutions to aluminum is 2.0 mils per year ("mpy") and the maximum corrosivity to brass and steel is 2.0 mpy when partially immersed and 5.0 when tested in the partially immersed condition. In the partially immersed configurations, one-half of the coupon is within the solution and one-half is exposed to the vapors in the air space over the solution.

In an effort to address the corrosivity problems encountered with the use of fertilizer grade ammonium polyphosphates, sodium ferrocyanide was incorporated into the corrosive compositions. Sodium ferrocyanide has proven to be an effective corrosion inhibitor in fire retardant compositions containing ammonium polyphosphate fertilizer solutions. However, while sodium ferrocyanide is effective as a corrosion inhibitor, several disadvantages of its use make its incorporation in wildland fire retardant compositions unacceptable. Specifically, the environmental and toxicological safety of ferro(i)cyanides is, at best, questionable. When exposed to acidic conditions and/or ultraviolet radiation from natural sunlight, the ferro(i)cyanide radical readily degrades releasing free iron and cyanide and/or hydrogen cyanide, which are toxic to humans, animals and aquatic life. Further, free iron emanating either from decomposition of a portion of the ferro(i)cyanide radical, or introduced from other components or impurities within the composition, will subsequently react with remaining non-decomposed ferro(i) cyanide to form ferricyanide ("Turnbull's Blue") or ferrocyanide ("Prussian Blue"), which emit a persistent blue-black coloration, staining all that they contact. Consequently, neither ferricyanide nor ferrocyanide can be used in fire-retardants that are expected to fade and become non-visible over time, for example, in fugitive retardant compositions. The magnitude of the above concerns is increased since wildland fire retardants are generally applied aerially in a less than completely controlled manner. Due to the presence of variables such as vegetative cover, smoke, or wind drift that impact the trajectory of the free-falling solution, aerially applied wildland fire retardant solutions may land on or near people, animals and in bodies of water or on soil where it could enter the water supply.

Accordingly, there is a need to provide safe and acceptable wildland fire retardants for the suppression or management of wildland fires that are not corrosive to the equipment associated with the transportation, handling and application of the retardant and that are both environmentally and toxicologically friendly, thereby avoiding the above disadvantages.

SUMMARY OF THE INVENTION

In overcoming the above disadvantages, it is an object of the invention to produce a wildland fire retardant composition that has a reduced-tendency to corrode various metals, and does not decompose with exposure to sunlight or acidic conditions, resulting in the release of toxic by-products that could be both environmentally and toxicologically hazardous.

It is a further object of the invention to provide a fire retardant composition that is compatible with the concept of a fugitive or fading color system, able to become invisible over time with exposure to natural sunlight.

The above and other objects are met by the present invention, which provides a corrosion-inhibited fire retardant composition including at least one fire retardant composition that includes at least one ammonium polyphosphate, at least one suspending agent and a corrosion inhibiting system that includes at least one corrosion inhibiting compound selected from a group of compounds consisting of azoles, insoluble ferric pyrophosphate, soluble ferric pyrophosphate (mixture or blend of sodium citrate and insoluble ferric pyrophosphate), ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate, and any combination thereof; wherein the corrosion inhibiting system is present in a minor effective amount to substantially reduce the corrosiveness of the fire retardant composition.

In a second aspect, the present invention provides a method of preparing the above-described corrosion-inhibited fire retardant compositions of the invention that includes the steps of forming an intermediate concentrate composition suitable for transportation and storage that includes the above-described corrosion-inhibited fire retardant composition of the invention; wherein the corrosion inhibiting system is present in a minor amount effective to substantially reduce the corrosivity of the fire retardant composition of the invention and diluting the intermediate concentrate with water to form the corrosion-inhibited fire retardant compositions of the invention.

In yet a third aspect, the present invention provides a method of suppressing wildland fires that includes aerially applying to wildland vegetation, ahead of wildland fire, a fire suppressing composition that is comprised of water and the above-described corrosion-inhibited fire-retardant compositions of the invention.

In a fourth aspect, the present invention provides a method of inhibiting corrosion that includes providing a corrodible material and contacting it with an effective amount of the above-described corrosion inhibiting system of the invention.

In a fifth aspect, the present invention provides a corrosion-inhibited agricultural plant nutrient that includes at least one agricultural plant nutrient and the above-described corrosion inhibiting system of the invention. Generally, the corrosion inhibiting system is present in a minor amount effective to substantially reduce the corrosiveness of the agricultural plant nutrient.

DESCRIPTION OF THE INVENTION

In accordance with the present invention, it has been discovered that a fire-retardant composition can be prepared that has a reduced tendency to corrode various metals, including aluminum, that is superior to known fire retardants in toxicological and environmental safety. The corrosion-inhibited fire retardant of the invention includes at least one fire retardant composition comprised of at least one ammonium polyphosphate, at least one suspending agent and a corrosion inhibiting system comprised of at least one corrosion inhibiting compound selected from a group of corrosion inhibiting compounds consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferrous fumarate, ferrous oxalate, ferrous oxide, ferric lactate, ferric resinate, and any combination thereof. Generally, the corrosion inhibiting system is present in a minor amount effective to substantially reduce the corrosiveness of the fire retardant composition.

The corrosion-inhibited fire retardant compositions of the invention, specially adapted for aerial application to wildland fires, is prepared by forming an intermediate concentrate composition comprising at least one fire retardant composition comprised of at least one ammonium polyphosphate, at least one suspending agent, and the above-described corrosion inhibiting system. The intermediate concentrate is then diluted with water to form the corrosion-inhibited fire retardant composition of the invention. Generally, the corrosion inhibiting system is present in the corrosion-inhibited fire retardant of the invention in a minor amount effective to substantially reduce the corrosiveness of the fire retardant composition.

In accordance with the present invention, the corrosion-inhibited fire retardant of the invention includes a fire retardant comprised of at least one ammonium polyphosphate. Ammonium polyphosphate is also referred to as polyammionium phosphate and may include both ortho- and polyphosphate, other ammonium phosphates such as pyro- and metaphosphates, the alkali metal equivalents thereof, as well as a blend of phosphate polymers.

The ammonium polyphosphate solutions that are used as agricultural fertilizer and wildland (vegetative) fire retardants are manufactured by neutralizing aqueous solutions of wet-process phosphoric acid, generally containing about 68% to about 74% phosphorus pentoxide with anhydrous ammonia in such a manner that both high temperature and pressure are experienced. When prepared in this manner, a portion of the impure orthophosphoric acid polymerizes or condenses, resulting in the formation of pyrophosphate, short chain polyphosphates and, in most instances, small amounts of cyclic or metaphosphates. That portion of the acid which does not polymerize, of course, remains as orthophosphoric acid. Ammoniation of this mixture of phosphate species occurs within the reactor, as well, resulting in an aqueous solution containing ammonium ortho, pyro, tripoly, tetrapoly and some higher chain and cyclic phosphate species. These condensed phosphates generally exhibit increased water solubility as compared to orthophosphates and, consequently, more highly concentrated solutions can be prepared when they are present. The relative concentrations of the various species depends primarily on the temperature and pressure achieved within the reactor. Commercial solutions generally contain from about 34% to about 37% phosphorus pentoxide. Phosphorus pentoxide concentrations above about 37% approach water solubility limits resulting in solutions that are not stable, from which solids may precipitate during ambient temperature storage. Solutions of this type are generally referred to as either 10-34-0 or 11-37-0 liquid concentrates; the numerical designation refers to the percentage of their plant nutrient composition, i.e., ammoniacal nitrogen, phosphorus pentoxide and potassium oxide.

It should be noted that the condensed phosphates which are present in liquid concentrate solutions are subject to hydrolyses which results in de-polymerization. The rate of hydrolytic degradation increases with time, temperature and the relative acidity of the solution. Therefore, ammonium polyphosphate concentrates and their solutions may vary in species composition as received and as time progresses during their subsequent storage.

These liquid concentrates may additionally contain small amounts of diammonium sulfate and a host of metal and alkali-metal impurities. The quantity and quality of these impurities vary with the composition of the phosphate ore, the utilized process and the extent of purification that is conducted during manufacture of the wet-process phosphoric acid. Since these solutions are manufactured primarily as nutrients, the quality control parameters of greatest interest are the percentages of their contained nutrients—nitrogen and phosphorus—and the clarity, stability and color of the solution rather than purity per se.

The corrosion inhibiting system of the invention is comprised of at least one corrosion inhibiting compound selected from a group of corrosion inhibiting compounds consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate, and any combination thereof. In one preferred embodiment, the corrosion inhibiting system is comprised of at least one soluble corrosion.

A minor amount of the corrosion inhibiting system of the invention effective to substantially reduce the corrosiveness of the fire retardant composition is included in the corrosion-inhibited fire retardant composition of the invention. A minor effective amount of the corrosion inhibiting system is that amount which substantially reduces the corrosivity of the fire retardant. As is understood by one of ordinary skill in the art, what constitutes a substantial reduction in corrosivity is largely dependent on the specific fire retardant used in the fire retardant composition of the invention, as well as the specific composition of the corrosion inhibiting system and can be readily determined without undue experimentation.

In one embodiment, the corrosion inhibiting system of the invention is present in a minor amount effective in the corrosion-inhibited fire retardant composition, in concentrate, to obtain at least one of a maximum corrosivity of aluminum to 5.0 mpy, yellow brass to 5.0 mpy, and steel to 5.0 mpy, as determined by the "Uniform Corrosion Test" set forth in Section 4.5.6.1.2 of "Specification 5100-304b (July 1999) Superseding Specification 5100-304a (February 1986)," entitled "Specification For Long Term Retardant, Wildland Fire, Aircraft or Ground Application," issued by the USDA.

In a specific embodiment, the corrosion inhibiting system of the invention comprises in the range of about 0.01% to about 10.0% of the total corrosion-inhibited fire retardant. In another specific embodiment, the corrosion inhibiting system of the invention comprises in the range of about 0.3% to about 6.0% of the total corrosion-inhibited fire retardant. In yet another specific embodiment, the corrosion inhibiting system of the invention comprises in the range of about 0.6% to about 5.0% of the total corrosion-inhibited fire retardant.

Prior to use, and in one embodiment of the invention, the corrosion-inhibited compositions of the invention are blended with water to form dilute solutions containing the amount of phosphorus pentoxide required to achieve the maximum amount of vegetation coverage at an application rate sufficient to reduce the flammability of the vegetative fuels to the desired level. The water used in the composition of the invention may be tap water or water from other convenient water sources.

In a specific embodiment, the compositions of the invention are blended with water to form dilute solutions containing the amount of phosphorus pentoxide required to meet USDA, Forest Service Specification fire-retardant effectiveness requirements. This concentration, which is determined via combustion-retarding effectiveness testing described in USDA, Forest Service Specification 5100-304b, "4.5.2. Combustion Retarding Effectiveness Test," will generally depend on the percentage of phosphorus pentoxide present in the concentrated composition and the extent of its availability for retarding reactions. The corrosion-inhibited fire retardant composition of the invention is typically diluted to an amount effective to achieve maximum coverage of vegetation at an application rate sufficient to reduce the flammable fuels to a desired level. The minium USDA, Forest Service Specifications, for combustion retarding effectiveness, as specified in Specification 5100-304b, is generally obtained when the corrosion-inhibited fire retardant concentrate of the invention is diluted with about 1 to about 8 volumes of water.

To suppress wildland fires, the corrosion-inhibited fire retardant compositions of the invention are diluted with water and applied on threatened vegetation, ahead of approaching wildland fire. Ammonia from both the ammonium phosphate and the ammonium sulfate are liberated at temperatures below the ignition temperature of the fuel. The phosphoric and sulfuric acids are both initially effective fire retarding acids. The phosphoric acid will remain present and effective with the vegetative fuel until temperatures exceed 600° C. However, the boiling point of sulfuric acid is much lower and the amount present will decrease as fuel temperature increases. Thus, at least a portion of the sulfuric acid is still present at the ignition temperature of the fuel. The resultant mineral acids subsequently react with the cellulosic components of vegetative fuels on which they are applied. Their thermal decomposition is thereby altered in such a manner that they will no longer serve as fuel. These reactions are described in U.S. Pat. No. 4,839,065 to Vandersall.

The fire retardant compositions of the invention also contain suspending agents. Suspending agents effectively reduce the rate of separation and settling during long term storage. Thus, as one skilled in the art would appreciate, the amount of suspending agent depends upon its relative effectiveness per unit applied, the desired length of storage and the additional additives incorporated into the compositions of the invention. As used herein, suspending agents useful in the compositions of the invention include colloidal clays, for example, Attapulgus, Fuller's earth, sepiolite, montomorillonite, and Kaolin clay. As used herein, Attapulgus clay includes, but is not limited to attapulgite and palygorskite. As used herein, Kaolin clay includes, but is not limited to Kaolinite, [Al2Si2O7-2(H2O)] and [Al2O3-2SiO2-2(H2O)].

As will be apparent to those skilled in the art, the corrosion-inhibited fire retardant of the invention may contain or be mixed with other functional components such as coloring agents, surfactants, stabilizers, opacifying agents, other corrosion inhibitors, any combination thereof, or with other functional components.

For example, and in one embodiment of the invention, the corrosion-inhibited fire retardant composition of the invention includes at least one highly colored pigment. The colored pigment is incorporated to assist in the visual identification of treated and untreated vegetation. Suitable highly colored pigments include iron oxide, which produces many colors like brown and red, titanium dioxide pigments, which produce a white color, or an ultra-violet sensitive dye dispersed in biodegradable plastic. However, for certain uses, like along roadsides or in parks, it may be desirable to exclude any colorant from the mixture. Accordingly, as one skilled in the art would appreciate, the amount of colorant or pigment incorporated into the compositions of the invention depends on the degree of the dilution and visibility contemplated by the user. Visibility is usually obtained with red iron oxide when it is present in the diluted solution in the range of about 0.15% to about 0.4%, depending on the colorant characteristics and on the vegetative and topographical characteristics of that on which it will be applied. The amount which must be incorporated in the concentrate will, of course, vary with the dilution rate required to provide adequate fire retarding effectiveness.

In another embodiment, the present invention includes at least one of red iron oxide or brown iron oxide, or a combination thereof. In yet another embodiment, the present invention includes a fugitive coloring agent, whose color fades upon exposure to the elements. In a further embodiment, the present invention includes opacifying pigments, which are generally not highly colored, but have the ability to cover and hide that on which it is deposited so that a highly colored pigment becomes more visible.

Surfactants may also be added to increase visibility, through the generation of a foam, and to improve penetration of the retardant solution into porous fuels. Accordingly, as one skilled in the art would appreciate, the amount and type of surfactant incorporated into the compositions of the invention depends on the degree of the dilution and visibility contemplated by the user.

It has been discovered that azoles are effective corrosion inhibitors for brass. In one embodiment of the invention, the compositions of the invention comprise at least one azole. As used herein, an azole is any of a group of chemical compounds with a five-membered ring containing one or more nitrogen atoms. Azoles suitable for use in the corrosion-inhibited fire retardants of the invention include, but are not limited to tolytriazole, benzotriazole, mercaptobenzothiazole, dimercaptomthiadiazole, 1,2 benzisothiazoline-3-1, 2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof. The amount of azole or other corrosion inhibitor is dependent upon the corrodible metal for which corrosion resistance is desired, the level or resistance desired and the specific concentration of the fire retardant composition employed, including corrosion inhibiting compounds contained therein.

However, in one embodiment of the invention, the corrosion-inhibited fire retardant concentrates of the invention include at least one azole, present in a minor amount effective to obtain a corrosivity of yellow brass to a maximum of 5.0 mpy, as determined by the "Uniform Corrosion Test" set forth in Section 4.5.6.1 of "Specification 5100-304b (July 1999) Superseding Specification 5100-304a (February 1986)," entitled "Specification For Long Term Retardant, Wildland Fire, Aircraft or Ground Application," issued by the USDA. In a specific embodiment of the invention, the fire retardant concentrate of the invention comprises in the range of about 0.01% to about 1.0% tolytriazole. In yet another specific embodiment, the composition of the invention includes in the range of about 0.2% to about 0.6% tolytriazole. In yet another specific embodiment, the composition of the invention includes in the range of about 0.3% to about 0.5% tolytriazole.

In one embodiment, the above described corrosion-inhibited fire retardant composition is used as an agricultural plant nutrient. The corrosion inhibiting system is present in a minor effective amount to substantially reduce corrosiveness of the agricultural plant nutrient. As one skilled in the art can appreciate, the effective amount varies depending on the specific plant nutrient formulated. However, one skilled in the art can determine the amount without undue experimentation.

A method of inhibiting corrosion using the above-described corrosion inhibiting system of the invention is also provided. According to the method of the invention, a corrodible material is provided and contacted with at least one suspending agent and an effective amount of the corrosion inhibiting system of the invention to substantially reduce the corrosiveness of the agricultural plant nutrient.

Any corrodible material may be used according to the method of inhibiting corrosion of the invention. In one embodiment, the corrodible material is selected from a group of corrodible materials consisting of steel, brass, aluminum and any alloy thereof.

Prior to use, and in one embodiment of the invention, the corrosion inhibiting system is blended with water prior to or during contact with the corrodible material. The water used in the composition of the invention may be tap water or water from other convenient water sources.

In one embodiment, the corrosion inhibiting system includes at least one additive selected from a group of additives including coloring agents, surfactants, opacifying pigments, stabilizers, corrosion inhibitors and any combination thereof.

All references and patents cited herein are hereby incorporated by reference in their entireties for their relevant teachings. Accordingly, any reference cited herein and not specifically incorporated by reference is, nevertheless, incorporated by reference in its entirety as if part of the present specification.

The following examples illustrate specific embodiments of the invention without limiting the scope of the invention in any way. In each example, samples of ammonium polyphosphate fire retardant concentrates were mechanically admixed with iron containing compounds, as indicated, and in some cases, with an azole, as indicated in each table. Any mechanical mixing technique that is well known in the art may be used in the present invention. The diluted fire retardant solutions are diluted with water, as indicated. The "Requirements" row illustrates the level of aluminum 2024-T3 corrosion allowed by the USDA, Forest Service Specifications 5100-304b, i.e., the maximum allowable corrosivity for product acceptance for use in wildland fire retardant compositions. The resulting samples were tested for corrosivity in accordance with USDA, Forest Service Specifications 5100-304b.

EXAMPLE 1

The Aluminum Corrosivity of Neat Ammonium Polyphosphate Solution

Table 1 illustrates the corrosion characteristics of neat, unadulterated fertilizer grade 10-34-0 and 11-37-0 ammonium polyphosphate liquid concentrates obtained from three different sources. All of the samples are either 10-34-0 or 11-37-0, as received with no additions. The corrosivity of the samples were expressed in mils of metal loss on exposed metal surface extrapolated from 90 to 365 days (mpy) and ascertained using the aforementioned USDA, Forest Service Specifications for determining corrosivity. Both the concentrated retardant and its diluted solutions were tested at each temperature and condition indicated.

be lost during a one-year period at the test condition. The corrosion rate of both the partially and totally immersed coupons were calculated using the total surface area of the coupon. The samples at each condition were then averaged and reported as the corrosion rate. The results are shown in Table 1.

TABLE 1

| | Aluminum Corrosivity when tested in the indicated configuration (mpy) | | | | | | | |
|---|---|---|---|---|---|---|---|---|
| | Neat Concentrate | | | | Diluted Solution | | | |
| Ammonium Polyphosphate Samples | 70 total | 70 partial | 120 total | 120 partial | 70 total | 70° F. partial | 120 total | 120 partial |
| Requirements | ≤5.0 | ≤5.0 | ≤5.0 | ≤5.0 | ≤2.0 | ≤2.0 | ≤2.0 | ≤2.0 |
| Sample 1 | 8.7 | 4.3 | 134.3 | 77.8 | 8.4 | 6.5 | 24.9 | 5.7 |
| Sample 2 | 12.4 | 6.6 | 106.6 | 78.5 | 15.2 | 8.4 | 10.1 | 5.6 |
| Sample 3 | | | 146.0 | | | | 5.8 | |
| Sample 4 | 8.1 | 4.1 | 140.7 | 67.4 | 5.8 | 6.3 | 11.4 | 7.8 |
| Sample 5 | | | 129.4 | | | | 11.0 | |
| Sample 6 | | | 170.0 | | | | 10.8 | |
| Sample 7 | | | 168.5 | | | | 7.4 | |
| Sample 8 | 10.2 | 5.3 | 165.0 | 88.6 | 12.3 | 6.4 | 21.8 | 13.3 |
| Sample 9 | 10.9 | 5.5 | 161.4 | 85.3 | 12.0 | 7.0 | 39.0 | 14.8 |
| Sample 10 | | | 130.0 | | | | 21.1 | |
| Sample 11 | | | 126.2 | | | | 22.8 | |
| Sample 12 | 4.3 | | 109.4 | | 11.0 | | 6.4 | |
| Sample 13 | | | 149.4 | | | | 33.7 | |
| Sample 14 | 9.5 | | 155.6 | | 12.7 | | 35.8 | |
| Sample 15 | 12.7 | 6.0 | 201.0 | 96.5 | 12.8 | 7.5 | 35.8 | 19.3 |
| Sample 16 | 13.1 | 7.1 | 159.0 | 86.7 | 11.2 | 6.5 | 42.7 | 21.8 |
| Sample 17 | | | 151.5 | | | | 13.3 | |
| Sample 18 | | | 136.3 | | | | 29.2 | |
| Sample 19 | 12.0 | 6.3 | 144.8 | 94.5 | 17.7 | 10.4 | 10.5 | 7.0 |
| Sample 20 | 9.9 | | 115.8 | | 13.8 | | 12.4 | |
| Sample 21 | 15.2 | | 176.9 | | 12.7 | | 35.1 | |
| Sample 22 | 10.9 | 5.5 | 172.6 | 74.8 | 13.1 | 7.2 | 42.9 | 18.3 |
| Average | 10.6 | 5.6 | 147.7 | 83.3 | 12.2 | 7.4 | 22.0 | 12.6 |
| Range (Lo–Hi) | 4.3–15.2 | 4.1–7.1 | 106.6–201.0 | 67.4–94.5 | 5.8–17.7 | 6.3–10.4 | 5.8–42.9 | 5.6–21.8 |

The diluted solutions were prepared by admixing four to five volumes of water with one volume of the concentrated solution. Thus, the diluted solutions were in the range of between about 15% to about 20% by volume of the concentrate.

In accordance with the Forest Service Specifications for corrosion testing of fire retardants, a one inch wide, four inches long, one-eight inch thick coupon of the aluminum was obtained from a standard source. The coupon is cleaned, dried and weighed according to standard USDA, Forest Service Specifications and suspended in a one quart, straight sided jar filled either 50% (partially) or 100% (totally) full using a piece of nylon string. When suspended in a partially full jar, the coupon was 50% (two inches) immersed in the test solution with the other 50% extending up from the solution into the air space above it. When the jar was full with approximately 800 ml of the solution, the metal coupon was totally immersed in the solution. The jars were then closed with a screw cap and two or three identical corrosion jars (cells) of each partially and totally immersed coupons were stored at 70° F. and 120° F. for ninety days. At the end of the ninety day storage period, the jars were opened and the coupons were removed and cleaned according to the USDA, Forest Service Specifications. The coupon was then re-weighed after it dried and its weight loss was determined by comparing its initial and final weights. The calculated weight loss and density of the metal coupon were used to extrapolate to mils (0.001 inches) of aluminum that would The corrosivity of the ammonium polyphosphate solutions to aluminum 2024T-3 was relatively low when the temperature was maintained at about 70° F. However, none of the samples of the neat ammonium polyphosphate solutions met the Forest Service Specifications for corrosivity of fire retardants. In addition, the results showed that increasing the solution temperature to 120° F. dramatically increased the corrosion of the aluminum coupon by the neat ammonium polyphosphate samples, i.e., in excess of an order of magnitude.

EXAMPLE 2

The Aluminum Corrosivity of Ammonium Polyphosphate Solution Containing 1.2% Iron Oxide ($Fe_2O_3$) & 1.4% Attapulgus Clay The corrosion characteristics of neat fertilizer grade ammonium polyphosphate solutions containing additional amounts (<3%) of a mixture of an iron oxide colorant and Attapulgus clay is illustrated in Table 2. Each sample was prepared by admixing neat concentrated ammonium polyphosphate obtained from several sources with 1.4% Attapulgus clay, and either 1.2% red iron oxide or 1.2% brown iron oxide, as indicated. In addition, 0.3% tolytriazole was also admixed into Samples 11, 15, 16, 18 and 19 and 0.5% tolytriazole was admixed into sample 20. Aliquots from these concentrate samples were then diluted by admixing 1.0 volume of concentrate with 4.25 volumes of tap water. The concentrates and their solutions were then tested for corrosivity and diluted in accordance with Forest Service Specifications. The results are shown in Table 2.

EXAMPLE 3

The Aluminum Corrosivity of Ammonium Polyphosphate Solutions Containing a Mixture of Soluble and Insoluble Iron Compounds The data in Tables 3a and 3b illustrate the relative effectiveness of a number of corrosion inhibitor systems

TABLE 2

| | | Corrosion Rate (milli-inches per year) | | | | | | | |
|---|---|---|---|---|---|---|---|---|---|
| | | Neat Concentrate | | | | Diluted Solution | | | |
| Ammonium Polyphosphate Samples | Type of Iron Oxide | 70° F. total | 70° F. partial | 120° F. total | 120° F. partial | 70° F. total | 70° F. partial | 120° F. total | 120° F. partial |
| Corrosion of neat 10-34-0 Average from Table 1 | none | 10.6 | 5.6 | 147.7 | 83.3 | 12.2 | 7.4 | 22.0 | 12.6 |
| Requirements | | ≦5.0 | ≦5.0 | ≦5.0 | ≦5.0 | ≦2.0 | ≦2.0 | ≦2.0 | ≦2.0 |
| Sample 1 | Bn Iron oxide[1] | | | 1.4 | | | | 4.4 | |
| Sample 2 | Bn Iron oxide[1] | | | 0.7 | | | | 3.7 | |
| Sample 3 | Bn Iron oxide[1] | | | 1.4 | | | | 2.3 | |
| Sample 4 | Bn Iron oxide[1] | | | 6.4 | | | | 10.1 | |
| Sample 5 | Rd Iron oxide[2] | 4.6 | 3.6 | 7.3 | 5.0 | 6.7 | 4.4 | 4.0 | 3.6 |
| Sample 6 | Rd Iron oxide[2] | 3.5 | 1.9 | 6.7 | 9.0 | 4.3 | 3.9 | 2.5 | 3.3 |
| Sample 7 | Rd Iron oxide[2] | | | 2.3 | | | | 4.5 | |
| Sample 8 | Rd Iron oxide[2] | 3.5 | 3.8 | 1.7 | 1.6 | 2.8 | 4.3 | 3.5 | 3.6 |
| Sample 9 | Rd Iron oxide[2] | | | 3.0 | | | | 3.1 | |
| Sample 10 | Rd Iron oxide[2] | | | 15.3 | | | | 11.7 | |
| Sample 11 | Rd Iron oxide[2] | | | 32.1 | | | | 7.1 | |
| Sample 12 | Rd Iron oxide[2] | | | 8.3 | | | | 3.8 | |
| Sample 13 | Rd Iron oxide[2] | | | 26.3 | | | | 3.9 | |
| Sample 14 | Rd Iron oxide[2] | | | 19.7 | | | | 3.8 | |
| Sample 15 | Rd Iron oxide[2] | | | 4.3 | | | | 0.8 | |
| Sample 16 | Rd Iron oxide[2] | | | 6.7 | | | | 5.3 | |
| Sample 17 | Rd Iron oxide[2] | | | 2.3 | | | | 4.2 | |
| Sample 18 | Rd Iron oxide[2] | 1.4 | | 8.0 | | 2.7 | | 2.0 | |
| Sample 19 | Rd Iron oxide[2] | 5.0 | 3.5 | 8.5 | 13.7 | 5.7 | 4.2 | 5.4 | 4.1 |
| Sample 20 | Rd Iron oxide[2] | 4.4 | 2.4 | 11.2 | 2.8 | 4.1 | 4.0 | 2.3 | 2.8 |
| Sample 21 | Rd Iron oxide[2] | | | 2.0 | | | | 1.9 | |
| Sample 22 | Rd Iron oxide[2] | | | 7.8 | | | | 11.1 | |
| Average | | 3.7 | 3.0 | 8.3 | 6.4 | 4.4 | 4.2 | 4.6 | 3.5 |
| Range | | 1.4–5.0 | 1.9–3.8 | 0.7–32.1 | 1.6–13.7 | 2.7–5.7 | 3.9–4.3 | 2.5–11.7 | 2.8–4.1 |

[1]Brown iron oxide, Lot number 5594050A, Elementis Pigments No. 8690.
[2]Red iron oxide, Lot number 5891719A, Elementis Pigments R03097 precipitated Kroma red pigment The results indicated that the addition of small amounts of iron oxide and clay reduced the corrosion of totally immersed aluminum in a 70° F. solution by 50% to 65%. In addition, the impact of the mixture on high temperature corrosion was even more dramatic than at low temperature. When the corrosion cell was stored at 120° F., the rate of aluminum corrosion decreased by about 75% to 90%. At both temperatures the corrosion rate on partially immersed coupons was greater than 50% of the totally immersed values, which indicated that significant interface or vapor/air phase corrosion occurs when the mixture is present in the solution. This differs from the corrosivity of the neat ammonium polyphosphate solutions of Table 1. However, the addition of 1.2% insoluble iron oxide and a suspending clay to the ammonium polyphosphate samples did not reduce the aluminum 2024-T3 corrosion rate of the concentrates or its solutions to within the limits required by the USDA, Forest Service Specifications.

containing water soluble and water insoluble sources of iron, and mixtures thereof, in several sources and types of ammonium polyphosphate concentrates and their diluted solutions. The samples were prepared by admixing either 10-34-0 or 11-37-0 type ammonium polyphosphate solutions from various sources with varying concentrations of insoluble red iron oxide or brown iron oxide additives and Attapulgus clay additives and varying the concentrations of other iron containing additives, as indicated. Samples 1, 2, 3 and 4 are 10-34-0 ammonium polyphosphate concentrates from different sources. The solutions were subjected to high shear mixing in order to activate or hydrate the clay.

Each concentrate and its diluted solution was tested for aluminum corrosivity in accordance with the Forest Service Specification protocols. The results are shown in Tables 3a and 3b.

TABLE 3a

| | | | | | | | |
|---|---|---|---|---|---|---|---|
| | | | CORROSION (mpy) | | | | |
| | Ammonium Polyphosphate | Insoluble Iron Oxide Added | | Other Iron Containing Additive | | Fe. Content | |
| | Sample | % | Type | (%) | Additive | % insol. | % sol. |
| 1 | SAMPLE 1 (from Table 1) | 0.0 | None | 0.0 | None | 0.00 | 0.00 |
| 2 | | 1.2 | Iron oxide | 0.0 | None | 0.00 | 0.00 |
| 3 | | 0.6 | Br. Iron oxide | 3.0 | Sol. Ferric pyrophosphate | 0.42 | 0.35 |
| 4 | | 0.6 | Br. Iron oxide | 5.0 | Sol. Ferric pyrophosphate | 0.42 | 0.58 |
| 5 | | 1.2 | Br. Iron oxide | 3.0 | Sol. Ferric pyrophosphate | 0.84 | 0.35 |
| 6 | | 1.2 | Br. Iron oxide | 3.0 | Sol. Ferric pyrophosphate | 0.84 | 0.35 |
| 7 | | 1.2 | Red Iron oxide | 3.0 | Sol. Ferric pyrophosphate | 0.84 | 0.35 |
| 8 | | 1.2 | Red Iron oxide | 3.0 | Sol. Ferric pyrophosphate | 0.84 | 0.35 |
| 9 | | 1.2 | Red Iron oxide | 3.0 | Sol. Ferric pyrophosphate | 0.84 | 0.35 |
| 10 | | 1.2 | Red Iron oxide | 3.0 | Sol. Ferric pyrophosphate | 0.84 | 0.35 |
| 11 | | 1.2 | Red Iron oxide | 3.0 | Sol. Ferric pyrophosphate* | 0.84 | 0.35 |
| 12 | | 1.2 | Red Iron oxide | 3.0 | Sol. Ferric pyrophosphate* | 0.84 | 0.35 |
| 13 | | 0.6 | Br. Iron oxide | 0.6 | Sol. Ferric citrate* | 0.42 | 0.13 |
| 14 | | 0.6 | Br. Iron oxide | 3.0 | Sol. Ferric citrate | 0.42 | 0.66 |
| 15 | | 0.6 | Br. Iron oxide | 3.0 | Sol. Ferric citrate* | 0.42 | 0.66 |
| 16 | | 1.2 | Br. Iron oxide | 1.8 | Sol. Ferric citrate* | 0.84 | 0.40 |
| 17 | | 1.2 | Br. Iron oxide | 1.8 | Sol. Ferric citrate* | 0.84 | 0.40 |
| 18 | | 1.2 | Red Iron oxide | 1.8 | Sol. Ferric citrate* | 0.84 | 0.40 |
| 19 | | 1.2 | Br. Iron oxide | 3.0 | Sol. Ferric citrate* | 0.84 | 0.66 |
| 20 | | 1.2 | Br. Iron oxide | 3.0 | Sol. Ferric citrate | 0.84 | 0.66 |
| 21 | | 1.2 | Br. Iron oxide | 3.0 | Sol. Ferric citrate | 0.84 | 0.66 |
| 22 | | 1.2 | Br. Iron oxide | 3.0 | Sol. Ferric citrate | 0.84 | 0.66 |
| 23 | | 0.6 | Br. Iron oxide | 5.0 | Sol. Ferric NH4 citrate | 0.42 | 0.88 |
| 24 | | 1.2 | Red Iron oxide | 1.8 | Sol. Ferric NH4 citrate | 0.84 | 0.32 |
| 25 | | 1.2 | Red Iron oxide | 3.0 | Sol. Ferrous sulfate.7H2O | 0.84 | 0.60 |
| 26 | | 1.2 | Red Iron oxide | 1.2/3.0 | Insol./sol. Ferric pyrophosphate | 1.13 | 0.35 |
| 27 | | | | 1.2/3.0 | Insol./sol. Ferric pyrophosphate | 0.29 | 0.35 |
| 28 | | | | 1.2/3.0 | Insol./sol. Ferric pyrophosphate | 0.29 | 0.35 |
| 29 | | | | 3.0/3.0 | Insol./sol. Ferric pyrophosphate | 0.72 | 0.35 |
| 30 | | | | 1.2/3.0 | Insol ferric pyro/sol. Fe citrate | 0.29 | 0.66 |
| 31 | | | | 1.2/3.0 | Insol ferric ortho/sol. Ferric pyro | 0.37 | 0.35 |

| | Neat Concentrate | | | | Diluted Solution | | | |
|---|---|---|---|---|---|---|---|---|
| | 70° F. Total | 70° F. partial | 120° F. total | 120° F. Partial | 70° F. total | 70° F. partial | 120° F. total | 120° F. partial |
| 1 | 9.1 | 5.2 | 140.6 | 79.5 | 10.8 | 6.9 | 16 | 9.4 |
| 2 | 3.7 | 3 | 8.3 | 6.4 | 4.4 | 4.2 | 4.6 | 3.5 |
| 3 | | | 7.4 | | | | 0.5 | |
| 4 | | | 9.0 | | | | 0.6 | |
| 5 | | | 2.2 | | | | 1.0 | |
| 6 | | | 2.2 | | | | 1.0 | |
| 7 | | | 5.7 | | | | 1.3 | |
| 8 | | | 10.9 | | | | 2.5 | |
| 9 | | | 10.8 | | | | 1.6 | |
| 10 | | | 10.3 | | | | 1.5 | |
| 11 | | | 18.1 | | | | 1.6 | |
| 12 | 3.1 | 3.1 | 6.1 | 2.9 | 4.4 | 3.6 | 1.6 | 3.4 |
| 13 | | | 118.7 | | | | 1.4 | |
| 14 | | | 5.5 | | | | 0.6 | |
| 15 | | | 6.7 | | | | 0.6 | |
| 16 | | | 0.9 | | | | 0.5 | |
| 17 | | | 15.3 | | | | 3.3 | |
| 18 | | | 46.5 | | | | 2.2 | |
| 19 | | | 1.0 | | | | 0.7 | |
| 20 | | | 4.5 | | | | 0.7 | |
| 21 | | | 3.9 | | | | 0.6 | |
| 22 | | | 1.0 | | | | 0.7 | |
| 23 | | | 7.9 | | | | 0.8 | |
| 24 | | | 53.9 | | | | 3.4 | |
| 25 | | | 1.0 | | | | 3.4 | |
| 26 | | | 7.5 | | | | 1.3 | |
| 27 | | | 2.0 | | | | 1.2 | |
| 28 | | | 2.3 | | | | 0.7 | |
| 29 | | | 5.8 | | | | 1.0 | |
| 30 | | | 2.1 | | | | 1.2 | |
| 31 | | | 3.1 | | | | 1.5 | |

*These compositions contain 0.3–0.5% tolyltriazole for brass corrosion inhibition TABLE 3b

| | | | | CORROSION (MILS PER YEAR) | | | |
|---|---|---|---|---|---|---|---|
| | Ammonium Polyphosphate | Insoluble Iron Oxide Added | | Other Iron Containing Additive | | Fe. Content | |
| | Sample | % | Type | (%) | Additive | % insol. | % sol. |
| 32 | SAMPLE 1 | | | 1.2/3.0 | Insol ferric ortho/sol Ferric pyro | 0.37 | 0.35 |
| 33 | | | | 1.2/3.0 | Insol/sol. Ferric ortho | 0.37 | 0.41 |
| 34 | | | | 1.2/3.0 | Insol/sol. Ferric ortho | 0.37 | 0.41 |
| 35 | | | | 1.2/4.0 | Insol. Fe(III) orthophosphate/sol Fe(III) NH4 citrate | 0.37 | 0.70 |
| 36 | | | | 1.2/4.0 | Insol. Fe(III) orthophosphate/sol Fe(III) NH4 citrate | 0.37 | 0.70 |
| 37 | | | | 1.2/3.0 | Insol Fe oxalate 2H2O/sol Ferric pyrophosphate | 0.37 | 0.35 |
| 38 | | | | 1.2/3.0 | Insol. Fe oxalate/sol. Fe sulfate | 0.37 | 0.60 |
| 39 | SAMPLE 2 | 1.2 | Red Iron oxide | 3.0 | Sol. Ferric pyrophosphate | 0.84 | 0.35 |
| 40 | | 1.2 | Br. Iron oxide | 3.0 | Sol. Ferric citrate | 0.84 | 0.66 |
| 41 | SAMPLE 3 | 0.6 | Br. Iron oxide | 5.0 | Sol. Ferric citrate | 0.42 | 1.10 |
| 42 | | 1.2 | Br. Iron oxide | 3.0 | Sol. Ferric pyrophosphate | 0.84 | 0.45 |
| 43 | | 1.2 | Red Iron oxide | 3.0 | Sol. Ferric pyrophosphate | 0.84 | 0.35 |
| 44 | SAMPLE 4 | 1.2 | Red Iron oxide | 3.0 | Sol. Ferric pyrophosphate | 0.84 | 0.35 |
| 45 | SAMPLE 5[(2)] | 1.2 | Red Iron oxide | 3.0 | Sol. Ferric pyrophosphate | 0.84 | 0.35 |
| 46 | | 1.2 | Red Iron oxide | 4.0 | Sol. Ferric pyrophosphate | 0.84 | 0.46 |
| 48 | | 2.4 | Red Iron oxide | 3.0 | Sol. Ferric pyrophosphate | 1.68 | 0.35 |
| 49 | | 1.2 | Red Iron oxide | 3.0 | Sol. Ferric pyrophosphate | 0.84 | 0.35 |
| 50 | | 1.2 | Red Iron oxide | 3.0 | Sol. Ferric pyrophosphate | 0.84 | 0.35 |
| 51 | | 1.2 | Red Iron oxide | 3.0/3.0 | insol./sol. Ferric pyrophosphate | 1.56 | 0.56 |
| 52 | SAMPLE 6[(2)] | 1.2 | Br. Iron oxide | 3.0 | Sol. Ferric pyrophosphate | 0.84 | 0.35 |
| 53 | | 1.2 | Red Iron oxide | 3.0 | Sol. Ferric pyrophosphate | 0.84 | 0.35 |
| 54 | SAMPLE 7[(2)] | 1.2 | Red Iron oxide | 3.0 | Sol. Ferric pyrophosphate | 0.84 | 0.35 |

| | Neat Concentrate | | | | Diluted Solution | | | |
|---|---|---|---|---|---|---|---|---|
| | 70° F. total | 70° F. partial | 120° F. total | 120° F. partial | 70° F. total | 70° F. partial | 120° F. total | 120° F. partial |
| 32 | | | 2.2 | | | | 1.0 | |
| 33 | | | 1.9 | | | | 2.2 | |
| 34 | | | 1.9 | | | | 1.5 | |
| 35 | | | 2.3 | | | | 1.4 | |
| 36 | | | 1.8 | | | | 1.2 | |
| 37 | | | 17.0 | | | | 1.9 | |
| 38 | | | 37.4 | | | | 5.8 | |
| 39 | 1.2 | 0.9 | 10.1 | 5.2 | 3.7 | 3.7 | 1.4 | 1.7 |
| 40 | | | 0.2 | | | | 0.4 | |
| 41 | | | 6.2 | | | | 0.5 | |
| 42 | 2.8 | 2.7 | 110.1 | 70.2 | 11.0 | 6.7 | 7.6 | 3.5 |
| 43 | | | 33.2 | | | | 7.6 | |
| 44 | 3.7 | | 76.5 | | 6.4 | | 0.8 | |
| 45 | 2.3 | | 2.8 | | 2.8 | | 1.1 | |
| 46 | 1.8 | | 2.8 | | 2.6 | | 1.8 | |
| 48 | 1.4 | | 2.1 | | 2.7 | | 1.2 | |
| 49 | | | 4.0 | | | | 2.1 | |
| 50 | 1.6 | 1.0 | 2.4 | 1.7 | 2.0 | 3.2 | 1.1 | 2.0 |
| 51 | 0.6 | | 5.4 | | | | 1.6 | 0.9 |
| 52 | 2.1 | 1.7 | 113.0 | 52.7 | 11.8 | 6.2 | 8.1 | 4.5 |
| 53 | | | 21.0 | | | | 5.6 | |
| 54 | 4.2 | | 83.0 | | 3.8 | | 1.1 | |

[(1)]These compositions contain 0.3–0.5% tolyltriazole for brass corrosion inhibition
[(2)]11-37-0 type Ammonium Polyphosphate Sample For comparative purposes, line 1 illustrates the average corrosion characteristics of neat concentrate and dilute solutions from Sample 1, taken from Table 1, and line 2 illustrates the corrosion of the concentrate and diluted solutions when 1.2% iron oxide and 1.4% Attapulgus clay, with the exception of the formulations on line 9 which contained 0.7% Attapulgus clay and the formulation on line 11, which contained 2.8% Attapulgus clay, was mixed with the neat concentrate solution, see Table 2. Samples 1–4 were 10-34-0 type ammonium polyphosphate samples obtained from various sources. Samples 5–7 were 11-37-0 type ammonium polyphosphate samples obtained from various sources.

The data in Tables 1 and 2 illustrate that corrosive attack of aluminum was most severe when exposed to the fire retardant concentrate and its solutions at elevated (120° F./49° C.) temperature in the totally immersed configuration. Consequently, the evaluation of corrosion inhibiting systems stressed testing under these conditions. Periodic testing at other conditions was conducted. Lines 3 through 6 illustrate the corrosion inhibiting effectiveness of combinations of insoluble brown iron oxide and soluble ferric pyrophosphate. The results indicated that the USDA, Forest Service Specifications for corrosivity of fire retardants were met when 1.2% of the brown iron oxide was used in conjunction with 3.0% of the soluble ferric pyrophosphate. In addition, the results indicated that lower amounts of the insoluble iron oxide resulted in unacceptable corrosion in the concentrated retardant solution.

Lines 7 through 12 illustrate the effectiveness of corrosion inhibiting systems similar to those described in the preceding paragraph, except red iron oxide is substituted for brown iron oxide. The results indicate that the red iron oxide is effective in reducing the aluminum corrosion of the concentrated and diluted ammonium polyphosphate although perhaps not quite as effective as the brown iron oxide.

Lines 13–22 illustrate the corrosion inhibiting effectiveness of mixtures of insoluble iron oxide and soluble ferric citrate. The results indicated that ferric citrate was an equally effective substitute for soluble ferric pyrophosphate. In addition, the results indicate that a mixture of brown iron oxide and 3.0% soluble ferric citrate was capable of reducing the corrosivity of the ammonium polyphosphate samples to within acceptable levels for compliance with Forest Service Specifications for corrosivity of fire retardants.

Lines 23 and 24 illustrate the use of ferric ammonium citrate as a substitute for ferric citrate. The results indicated that the soluble ferric compounds was as effective as ammonium citrate in reducing corrosion of aluminum by ammonium polyphosphate solutions.

Lines 27 through 38 illustrate the effectiveness of systems in which only uncolored, soluble and insoluble iron containing compounds are used rather than the relatively highly colored persistent iron oxides. This is important where true fugitive retardants are desired, whereby the color gradually fades when exposed to natural sunlight and disappears so as not to permanently stain that on which it is applied.

Lines 26 through 38 illustrate the effectiveness of mixtures of soluble and insoluble ferric pyrophosphate. Acceptable aluminum corrosion properties wer obtained when 3.0% of the former and 1.2% of the latter were used as the corrosion inhibiting system in an ammonium polyphosphate solution. The results also indicated that an increased level of insoluble ferric pyrophosphate did not further reduce the corrosivity of the concentrate.

Lines 27 though 38 illustrate the aluminum corrosion inhibiting effectiveness of mixtures of the various soluble and insoluble iron compounds. Lines 37 and 38 revealed that, although effective, the tested ferrous salts were less effective at equivalent iron addition rates as compared to the ferric compounds.

Lines 39 through 44 illustrate the aluminum corrosion inhibiting effectiveness of various soluble and insoluble iron compounds when used in conjunction with 10-34-0 ammonium polyphosphate concentrates obtained from alternative sources. These data indicate that the amount and ratio of corrosion inhibitor necessary to reduce corrosivity to an acceptable level will need to be optimized dependent on the source and characteristics thereof.

Lines 45 through 54 illustrate the aluminum corrosion inhibiting effectiveness of the subject compounds when used in various sources of 11-37-0 type ammonium polyphosphate concentrate and their diluted solutions.

EXAMPLE 4

Corrosion Characteristics of Ammonium Polyphosphate Solutions Containing Water Soluble Iron Compounds Example 4 illustrates the effectiveness of water-soluble ferric pyrophosphate, ferric citrate and ferrous sulfate as aluminum corrosion inhibitors in ammonium polyphosphate solutions. In each sample, the indicated soluble iron compounds and 1.4% Attapulgus clay were admixed with neat ammonium polyphosphate. Aliquots were subsequently drawn from the concentrate and diluted with the prescribed amount of water. The aluminum corrosivity of both the concentrated fire retardants and their diluted solutions was determined in accordance with the aforementioned Forest Service Specifications. The results of this testing is shown in Table 4.

TABLE 4

| Ammonium Polyphosphate Samples | Soluble Iron Added | | | Aluminum Corrosion[1] | |
|---|---|---|---|---|---|
| | (%) | Additive | Total Fe (%) | Concentrate | Dilute Solution |
| Average Sample from Table 1 | 0 | None | 0 | 106.6–170.0 | 5.8–39.0 |
| 1 | 0.6 | Soluble ferric pyrophosphate | 0.07 | 150.6 | 1.5 |
| 2 | 3.0 | Soluble ferric pyrophosphate | 0.35 | 42.5 | 1.6 |
| 3 | 3.0 | Soluble ferric pyrophosphate | 0.35 | 75.4 | 1.2 |
| 4 | 3.0 | Soluble ferric pyrophosphate | 0.35 | 69.3 | 1.3 |
| 5 | 2.4 | Soluble ferric citrate | 0.53 | 113.1 | 2.5 |
| 6 | 3.0 | Soluble ferric citrate | 0.66 | 124.1 | 2.4 |
| 7 | 3.0 | Soluble ferric citrate | 0.66 | 17.0 | 1.1 |
| 8 | 3.0 | Ferrous sulfate.7H$_2$O | 0.60 | 27.9 | 3.1 |

[1]Aluminum 2024T3 coupons tested in the manner described in USDA, Forest Service specification 5100-304b. Values obtained when the corrosion cell was maintained at 120° F. (50° C.) for 90 days with the coupon totally immersed therein. The data is expressed in milli-inches per year.

The results indicate that both soluble ferric and ferrous iron containing salts show utility as aluminum corrosion inhibitors in ammonium polyphosphate solutions. Relatively small concentrations (0.35%) of soluble iron derived from a soluble ferric pyrophosphate decreased the corrosion rate of totally immersed aluminum exposed to 120° F. solutions of the diluted fire retardant to within the USDA Forest Service Specification requirements. The data illustrate that soluble iron containing compounds are most effective in controlling the corrosivity of diluted solutions. Since the corrosivity of both the concentrate and its diluted solutions is of importance, mixtures of water soluble and water insoluble iron compounds generally provide superior performance.

EXAMPLE 5

Corrosion Characteristics of Ammonium Polyphosphate Solutions Containing Other Water Soluble Iron Compounds Table 5 illustrates the effectiveness of water insoluble ferric orthophosphate, ferric pyrophosphate and ferrous oxalate as aluminum corrosion inhibitors in ammonium polyphosphate concentrates and their diluted solutions. 1.4% Attapulgus clay was mixed with the concentrated ammonium polyphosphate, with the exception of Samples 6 and 7 which contained 0.7% and 2.8% Attapulgus clay, respectively. Samples 13, 18 and 24 contained, also, an insoluble iron oxide as a solution colorant. The resultant fire retardant concentrates and their diluted solutions were evaluated in terms of aluminum corrosivity in accordance with the USDA Forest Service Specification requirements. The results of the testing are shown in Table 5.

1.2% red iron oxide, line 14. These comparisons illustrate the effectiveness of insoluble ferric pyrophosphate as an aluminum corrosion inhibitor for concentrated ammonium polyphosphate and its solutions. It was shown to be superior to red iron oxide when compared on an equal ferric iron level. Accordingly, the insoluble ferric pyrophosphate would be preferred in many applications since it is not highly colored like the conventional iron oxides, which result in highly visible and persistent discoloration of that on which it is applied. Consequently, inhibitor systems containing these components would be suitable for use in fugitive colored fire retardant formulations.

Lines 15–19 illustrate the further reduction in aluminum corrosion, which was obtained by combining iron oxide and ferric pyrophosphate in the same corrosion inhibiting system. The results indicated that several of these formulations met the USDA, Forest Service Specifications for corrosivity of aluminum in both the concentrate and dilute forms.

The data contained in lines 20 and 23 illustrate the effectiveness of insoluble ferric orthophosphate in inhibiting

TABLE 5

| | Ammonium Polyphosphate Samples | Iron Oxide Addition % | Type | Other Insol. Fe Additive (%) | Additive | Total Fe. Content (%) | Neat Concentrate 70° F. Total | 70° F. partial | 120° F. total | 120° F. Partial | Diluted Solution 70° F. total | 70° F. partial | 120° F. total | 120° F. partial |
|---|---|---|---|---|---|---|---|---|---|---|---|---|---|---|
| | | | | | | | Corrosion Rate (milli-inches per year) | | | | | | | |
| 1 | Neat 10-34-0[1] | 0.0 | None | 0.0 | None | 0.00 | 9.1 | 5.2 | 140.6 | 79.5 | 10.8 | 6.9 | 16.0 | 9.4 |
| 2 | Sample 1 | 0.0 | None | 1.2 | Ferric pyrophosphate | 0.29 | | | 2.9 | | | | 1.7 | |
| 3 | Sample 2 | 0.0 | None | 2.4 | Ferric pyrophosphate | 0.58 | | | 9.4 | | | | 3.7 | |
| 4 | Sample 3 | 0.0 | None | 3.0 | Ferric pyrophosphate | 0.72 | | | 3.5 | | | | 1.1 | |
| 5 | Sample 4 | 0.0 | None | 3.0 | Ferric pyrophosphate | 0.72 | | | 6.5 | | | | 2.2 | |
| 6 | Sample 5 | 0.0 | None | 3.0 | Ferric pyrophosphate | 0.72 | | | 2.1 | | | | 1.4 | |
| 7 | Sample 6 | 0.0 | None | 3.0 | Ferric pyrophosphate | 0.72 | | | 3.6 | | | | 2.1 | |
| 8 | Sample 7 | 0.0 | None | 3.0 | Ferric pyrophosphate | 0.72 | | | 1.0 | | | | 1.7 | |
| 9 | Sample 8 | 0.0 | None | 2.4 | Ferric pyrophosphate | 0.58 | | | 10.7 | | | | 1.0 | |
| 10 | Sample 9 | 0.0 | None | 3.0 | Ferric pyrophosphate | 0.72 | | | 5.5 | | | | 6.3 | |
| 11 | Sample 10 | 0.0 | None | 3.0 | Ferric pyrophosphate | 0.72 | 2.4 | | 6.2 | | 3.1 | | 1.1 | |
| 12 | Sample 11 | 0.0 | None | 3.0 | Ferric pyrophosphate | 0.72 | | | 3.4 | | | | 1.3 | |
| 13 | Sample 12 | 0.0 | None | 3.0 | Ferric pyrophosphate | 0.72 | | | 3.2 | | | | 2.2 | |
| 14 | Sample 13[2] | 1.2 | Red Iron oxide | 0.0 | None | 0.84 | 3.7 | 3.0 | 8.3 | 6.4 | 4.4 | 4.2 | 4.6 | 3.5 |
| 15 | Sample 14 | 1.2 | Red Iron oxide | 3.0 | Ferric pyrophosphate | 1.56 | 2.0 | 1.3 | 4.8 | 3.0 | 1.5 | 3.1 | 0.8 | 2.0 |
| 16 | Sample 15 | 1.2 | Red Iron oxide | 3.0 | Ferric pyrophosphate | 1.56 | 1.6 | | 6.2 | | 1.6 | | 1.0 | |
| 17 | Sample 16 | 1.2 | Red Iron oxide | 3.0 | Ferric pyrophosphate | 1.56 | 2.5 | | 0.7 | | 2.5 | | 0.6 | |
| 18 | Sample 17 | 1.2 | Red Iron oxide | 3.0 | Ferric pyrophosphate | 1.56 | 1.9 | 1.2 | 0.5 | 0.2 | 1.1 | 2.4 | 0.8 | 1.9 |
| 19 | Sample 18 | 1.2 | Red Iron oxide | 3.0 | Ferric pyrophosphate | 1.56 | 2.1 | | 2.7 | | 1.1 | | 0.8 | |
| 20 | Sample 19 | 0.0 | None | 1.2 | Ferric orthophosphate | 0.16 | | | 105.3 | | | | 1.7 | |
| 21 | Sample 20 | 0.0 | None | 1.8 | Ferric orthophosphate | 0.55 | | | 108.6 | | | | 3.8 | |
| 22 | Sample 21 | 0.0 | None | 2.4 | Ferric orthophosphate | 0.73 | | | 9.3 | | | | 4.1 | |
| 23 | Sample 22 | 0.0 | None | 3.0 | Ferric orthophosphate | 0.92 | | | 2.3 | | | | 4.2 | |
| 24 | Sample 23 | 1.2 | Brown Iron oxide | 3.0 | Ferric orthophosphate | 1.25 | | | 1.5 | | | | 1.0 | |
| 25 | Sample 24 | 0.0 | None | 1.2 | Ferrous oxlate | 0.37 | | | 90.0 | | | | 2.7 | |

[1]Average values from Table 1.
[2]See Table 2.

The corrosion inhibiting effectiveness of insoluble ferric pyrophosphate was shown by a comparison of the compositions containing only this component, lines 2–13, with line 1. The effectiveness was also shown by comparison with the corrosion of aluminum exposed to ammonium polyphosphate solutions. The results indicated that the pyrophosphate moiety may be somewhat superior to orthophosphate for inhibiting the corrosion of aluminum.

The data contained in line 24 indicates that increasing the ferric iron content of the corrosion inhibiting system by using mixtures of ferric orthophosphate and iron oxide was also an effective way of meeting the USDA, Forest Service Specifications for corrosivity of aluminum.

Line 25 in Table 5 illustrates the aluminum corrosion inhibiting effectiveness of small amounts of ferrous (FeII) iron when incorporated in ammonium polyphosphate concentrates and their diluted solutions.

EXAMPLE 6

Effectiveness of Azoles as Corrosive Inhibitors in Ammonium Polyphosphate Fire Retardant Compositions Example 6 illustrates the effectiveness of azoles as yellow brass corrosion inhibitors in concentrated ammonium polyphosphate based fire retardant formulations and in their diluted solutions. Each sample was prepared by mixing 1.4% Attapulgus clay, 1.2% red iron oxide and the indicated azole corrosion inhibitor in the neat, concentrated ammonium polyphosphate. Subsequently, the concentrates were diluted with water in the manner described herein. The samples were then tested in accordance with USDA Forest Service Specification requirements.

TABLE 6

THE IMPACT OF AZOLES ON THE CORROSION OF YELLOW BRASS EXPOSED TO CONCENTRATED AMMONIUM POLYPHOSPHATE AND ITS DILUTED SOLUTIONS.*

| | Corrosion of exposed yellow brass (mpy) | | | | | | | |
|---|---|---|---|---|---|---|---|---|
| | Concentrated Retardant | | | | | | Diluted Solution | |
| Corrosion Inhibitor System | 70T** | 70P | 120T | 120P | 70T | 70P | 120T | 120P |
| None | 0.5 | 0.6 | 0.6 | 2.0 | 1.5 | 5.7 | 20.3 | 14.9 |
| 0.3% tolyltriazole | | | 0.2 | | | | 0.3 | |
| 0.5% tolyltriazole | 0.0 | 0.1 | 0.10.1 | 0.0 | 0.0 | 0.0 | 0.0 | |
| 0.25% sodium tolyl triazole*** | | | 0.2 | | | | 0.1 | |
| 0.255% sodium tolyl-triazole+ | | | 0.2 | | | | 0.3 | |
| 0.425% sodium tolyl-triazole+ | | | 0.2 | | | | 0.1 | |
| 0.5% sodium tolyl-triazole*** | | | 0.1 | | | | 0.2 | |
| 0.5% sodium triazole++ | 0.1 | 0.1 | 0.10.1 | 0.1 | 0.1 | 0.3 | 0.1 | |
| 1.0% sodium triazole++ | 0.1 | 0.1 | 0.10.1 | 0.1 | 0.1 | 0.1 | 0.1 | |

*10-34-0 containing 1.4% Attapulgus clay and 1.2% red iron oxide in addition to the described inhibitor additive.
**70 and 120 refer to the solution storage temperature in ° F., T and P refer to total of partial immersion of the metal coupon in the retardant solution during storage.
***from a 50% aqueous solution of sodium tolyltriazole.
+from an 85% aqueous solution of sodium tolyltriazole.
++from 100% sodium triazole.

The results indicated that azoles, including both tolytriazoles and salts thereof are effective corrosion inhibitors for yellow brass in ammonium polyphosphate concentrates and solutions. These data and others included in previous Examples illustrate the advantages of using azoles in conjunction with the iron containing inhibitors of this invention to reduce both aluminum and brass corrosivity of the fire retardant compositions to within desirable limits.

In view of the above, it is seen that the various objects and features of the invention are achieved and other advantages and results are obtained. Variations and modification may be made to the various steps and compositions of the invention without departing from the scope of the invention.

We claim:
1. A corrosion-inhibited fire retardant composition comprising:
   at least one fire retardant composition comprising at least one ammonium polyphosphate;
   at least one suspending agent; and
   a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4,5,6,7-tetrahydrobenzotriazole, tolylimidazole, 2-(5ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate, and any combination thereof; wherein said corrosion inhibiting system is present in a minor amount effective to substantially reduce corrosiveness of said fire retardant composition.
2. The composition of claim 1 further comprising at least one additive selected from the group of additives consisting of coloring agents, surfactants, stabilizers, corrosion inhibitors other than those of the corrosion inhibiting system, opacifying pigments and any combination thereof.
3. The composition of claim 1 wherein said corrosion inhibitor is at least one azole and said azole is present in said corrosion-inhibited fire retardant composition, wherein the composition is in concentrate form suitable for dilution to a dilute form for application as a fire retardant, in a minor amount effective to obtain a maximum corrosivity of yellow brass to a maximum of 5.0 mils per year, as determined by the "Uniform Corrosion" test set forth in Section 4.5.6.1 of "Specification 5100-304b (July 1999) Superseding Specification 51000-0304a (February 1988)," entitled "Specification for Long Term Retardant, Wildland Fire, Aircraft or Ground Application," issued by the United States Department of Agriculture, Forest Service.

4. The composition of claim 1 wherein said coloring agent is at least one coloring agent selected from the group of coloring agents consisting of fugitive coloring agents, opacifying pigments, and highly colored coloring agents.

5. The composition of claim 1 wherein said suspending agent is at least one suspending agent selected from the group of suspending agents consisting of Attapulgus, sepiolite, Fuller's earth, montmorillonite, and Kaolin clay.

6. The composition of claim 1 wherein said corrosion inhibiting system comprises at least one water-soluble corrosion inhibiting compound and at least one water-insoluble corrosion inhibiting compound.

7. The composition of claim 1 wherein said corrosion inhibiting system is present in a minor amount effective in said corrosion-inhibited fire retardant composition, wherein the composition is in concentrate form suitable for dilution to a dilute form for application as a fire retardant, to obtain at least one of a maximum corrosivity of aluminum to 5.0 mils per year, yellow brass to 5.0 mils per year, and corrosivity of steel to 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service.

8. The composition of claim 1 further comprising water.

9. The composition of claim 1 wherein said corrosion inhibiting system comprises in the range of about 0.01% to about 10% of said corrosion-inhibited fire retardant composition.

10. The composition of claim 1 wherein said corrosion inhibiting system comprises in the range of about 0.30% to about 6.0% of said corrosion-inhibited fire retardant composition.

11. The composition of claim 1 wherein said corrosion inhibiting system comprises in the range of about 0.6% to about 5.0% of said corrosion-inhibited fire retardant composition.

12. A corrosion-inhibited fire retardant composition comprising:
at least one fire retardant comprising at least one ammonium polyphosphate;
at least one suspending agent;
a corrosion inhibiting system comprising at least one corrosion inhibiting compound selected from the group of corrosion inhibiting compounds consisting of an azole selected from the group consisting of tolytriazole, benzotriazole, 1,2 benzisothiazoline3-1, 2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric oleate, ferrous fumarate, ferrous oxide, ferric lactate, ferric resinate, and any combination thereof; wherein said corrosion inhibiting system is present in a minor amount effective to reduce corrosiveness of said ammonium polyphosphate to a maximum corrosivity of aluminum to 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant. Wildland Fire, Aircraft or Ground Application," issued by the United States Department of Agriculture, Forest Service; and
at least one additive selected from the group of additives consisting of coloring agents, surfactants, stabilizers, corrosion inhibitors, opacifying pigments and any combination thereof.

13. A method of preparing a corrosion-inhibited fire retardant composition, adapted for aerial application to wildland fires, the method comprising the steps of:
(a) forming an intermediate concentrate composition comprising:
(i) a fire retardant composition comprising at least one ammonium polyphosphate;
(ii) at least one suspending agent; and
(iii) a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4,5,6,7-tetrahydrobenzotriazole, tolylimidazole, 2-(5ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric fluoroborate, ferric hydroxide, ferric oleate, ferrous fumarate, ferrous oxide, ferric lactate, ferric resinate, and any combination thereof; wherein said corrosion inhibiting system is present in a minor amount effective to substantially reduce corrosiveness of said fire retardant composition; and
(b) diluting said intermediate concentrate with water to form said corrosion-inhibited fire retardant composition.

14. The method of claim 13 wherein said corrosion inhibiting system comprises at least one water-soluble corrosion inhibiting compound and at least one water-insoluble corrosion inhibiting compound.

15. The method of claim 13 wherein said intermediate concentrate composition further comprises at least one additive selected from the group of additives consisting of coloring agents other than those of the corrosion inhibiting system, surfactants, stabilizers, corrosion inhibitors, opacifying pigments and any combination thereof.

16. The method of claim 13 wherein said corrosion inhibiting system comprises at least one azole and said azole is present in said corrosion-inhibited fire retardant composition, in concentrate, in a minor amount effective to obtain a maximum corrosivity of yellow brass to 5.0 Corrosion-inhibited fire retardant compositions and methods of making and using the same are provided. The corrosion-inhibited fire retardant compositions are comprised of at least one fire retardant component, a suspending agent, and a corrosion inhibiting system. The corrosion inhibiting system is comprised of at least one corrosion inhibiting compound selected from a group of compounds including azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof. The corrosion inhibiting system is typically present in the fire retardant composition of the invention in a minor amount effective to substantially reduce corrosiveness of the concentrated fire retardant composition and of its diluted solution. Methods of using the corrosion inhibiting system and corrosion-inhibited agricultural plant nutrients are also provided. mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service.

17. The method of claim 13 wherein said corrosion inhibiting system is present in a minor amount effective to reduce the corrosiveness of said fire retardant composition, in concentrate, to at least one of a maximum corrosivity of aluminum to 5.0 mils per year, brass to 5.0 mils per year and steel to 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service.

18. The method of claim 13 wherein said intermediate concentrate composition is diluted such that a maximum corrosivity of aluminum is 2.0 mils per year and the maximum corrosivity of brass and steel is 2.0 mils per year when tested in the totally immersed condition and 5.0 mils per year when tested in the partially immersed condition, as specified and determined by the "Uniform Corrosion" test set forth in Section 4.5.6.1 of "Specification 5100-304b (July 1999) Superseding Specification 510-00304a (February 1986)," entitled "Specification for Long Term Retardant, Wildland Fire, Aircraft or Ground Application," issued by the United States Department of Agriculture, Forest Service.

19. The method of claim 15 wherein said coloring agent is at least one coloring agent selected from the group of coloring agents consisting of fugitive coloring agents, opacifying pigments, and highly colored coloring agents.

20. The method of claim 13 wherein said suspending agent is at least one suspending agent selected from the group of suspending agents consisting of Attapulgus clay, sepiolite, Fuller's earth, montmorillonite, and Kaolin clay.

21. A method of preparing a corrosion-inhibited fire retardant composition, adapted for aerial application to wildland fires, the method comprising:
   (a) forming an intermediate concentrate composition comprising:
      (i) at least one fire retardant comprising at least one ammonium polyphosphate;
      (ii) at least one suspending agent; and
      (iii) a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4,5,6,7-tetrahydrobenzotriazole, tolylimidazole, 2-(5ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric fluoroborate, ferric hydroxide, ferric oleate, ferrous fumarate, ferrous oxide, ferric lactate, ferric resinate, and any combination thereof; wherein said corrosion inhibiting system is present in a minor amount effective to reduce the corrosiveness of said fire retardant composition, in concentrate, to at least one of a maximum corrosivity of aluminum to 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service; and
   (b) diluting said intermediate concentrate with water to form said corrosion-inhibited fire retardant composition such that a maximum corrosivity to aluminum is 2.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service.

22. A method of suppressing wildland fires comprising aerially applying to wildland vegetation a fire suppressing composition comprising:
   water, and
   a corrosion-inhibited fire retardant composition comprising:
   at least on fire retardant composition comprising at least one ammonium polyphosphate;
   at least one suspending agent; and
   a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4,5,6,7-tetrahydrobenzotriazole, tolylimidazole, 2(5-ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate, and any combination thereof; wherein said corrosion inhibiting system is present in a minor amount effective to substantially reduce the corrosiveness of said fire retardant composition.

23. The method of claim 22 further comprising at least one additive selected from the group of additives consisting of coloring agents, surfactants, stabilizers, corrosion inhibitors other than those of the corrosion inhibiting system, opacifying pigments, and any combination thereof.

24. The method of claim 22 wherein said corrosion inhibitor is at least one azole and said azole is present in said corrosion-inhibited fire retardant composition, wherein the composition is in concentrate form suitable for dilution to a dilute form for application as a fire retardant, in a minor amount effective to obtain a corrosivity of yellow brass to a maximum of 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service.

25. The method of claim 23 wherein said coloring agent is at least one coloring agent selected from the group of coloring agents consisting of fugitive coloring agents, opacifying pigments, and highly colored colorants.

26. The method of claim 24 wherein said suspending agent is at least one suspending agent selected from the group of suspending agents consisting of Attapulgus clay, sepiolite, Fuller's earth, montmorillonite, and Kaolin clay.

27. The method of claim 22 wherein said corrosion inhibiting system comprises at least one water-soluble corrosion inhibiting compound and at least one water-insoluble corrosion inhibiting compound.

28. The method of claim 22 wherein said corrosion inhibiting system is present in a minor amount effective to reduce the corrosiveness of said fire retardant composition, wherein the composition is in concentrate form suitable for dilution to a dilute form for application as a fire retardant, to at least one of a maximum corrosivity of aluminum to 5.0 mils per year, brass to 5.0 mils per year, and steel to 5.0 mils per year, as determined by the "Uniform Corrosion" test set forth in Section 4.5.6.1 of "Specification 5100-304b (July 1999) Superseding Specification 510-00304a (February 1986)," entitled "Specification for Long Term Retardant, Wildland Fire, Aircraft or Ground Application," issued by the United States Department of Agriculture, Forest Service.

29. The method of claim 22 wherein said corrosion inhibiting system comprises in the range of about 0.01% to about 10.0% of said corrosion-inhibited fire retardant composition.

30. The method of claim 22 wherein said corrosion inhibiting system comprises in the range of about 0.30% to about 6.0% of said corrosion-inhibited fire retardant composition.

31. The method of claim 22 wherein said corrosion inhibiting system comprises in the range of about 0.60% to about 5.0% of said corrosion-inhibited fire retardant composition.

32. A method of suppressing wildland fires comprising aerially applying to wildland vegetation a fire suppressing composition comprising:
water; and
a corrosion-inhibited polyphosphate composition comprising:
at least one ammonium polyphosphate;
at least one suspending agent;
a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof; wherein said corrosion inhibiting system is present in a minor amount effective to reduce corrosiveness of said ammonium polyphosphate, wherein the composition is in concentrate form suitable for dilution to a dilute form for application as a fire retardant, a maximum corrosivity of aluminum to 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service; and
at least one additive selected from the group of additives consisting of coloring agents, surfactants, stabilizers, corrosion inhibitors, and any combination thereof.

33. A method of inhibiting corrosion comprising contacting a corrodible material with at least one suspending agent and an effective amount of a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4.5,6,7-tetrahydrobenzotriazole, tolylimidazole, 2-(5ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof.

34. The method of claim 33 wherein said corrosion inhibiting system comprises at least one water-soluble corrosion inhibiting compound and at least one water-insoluble corrosion inhibiting compound.

35. The method of claim 33 wherein said corrosion inhibiting system further comprises at least one additive selected from the group of additives consisting of coloring agents other than those of the corrosion inhibiting system, opacifying pigments, surfactants, stabilizers, corrosion inhibitors, and any combination thereof.

36. The method of claim 33 wherein said corrodible material is at least one material selected from the group of corrodible materials consisting of steel, brass and aluminum.

37. The method of claim 33 wherein said corrosion inhibiting system further comprises water.

38. The method of claim 33 wherein said suspending agent is at least one suspending agent selected from the group of suspending agents consisting of Attapulgus clay, Fuller's earth, montmorillonite, sepiolite and Kaolin clay.

39. A corrosion-inhibited agricultural plant nutrient comprising:

at least one agricultural plant nutrient;

at least one suspending agent; and a corrosion inhibiting system comprising at least one corrosion inhibiting compound selected from the group of corrosion inhibiting compounds consisting of an azole selected from the group consisting of tolytriazole, benzotriazole, 1,2 benzisothiazoline-3-1, 2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof; wherein said corrosion inhibiting system is present in a minor amount effective to substantially reduce corrosiveness of said agricultural plant nutrient.

* * * * *

UNITED STATES PATENT AND TRADEMARK OFFICE
CERTIFICATE OF CORRECTION

PATENT NO. : 6,802,994 B1
DATED : October 12, 2004
INVENTOR(S) : Gary H. Kegeler and Howard L. Vandersall It is certified that error appears in the above-identified patent and that said Letters Patent is hereby corrected as shown below:

Column 22,
Line 13, add hyphen as follows -- ...2-(5-ethyl-2-pyridyi)... --

Column 23,
Line 55, should read -- ...water-soluble ferric orthophosphate... --

Column 24,
Line 24, add hyphen as follows -- ...2-(5-ethyl-2-... --

Column 24, line 58 through Column 25, line 14,
Should read -- mils per year,... --

Column 25,
Line 41, add zero as follows -- ...Superseding Specification 5100-00304a... --

Column 26,
Line 1, add hyphen as follows -- ...2-(5-ethyl-2-... --
Line 41, should read -- ... at least one fire retandant... --
Line 50, add hyphen as follows -- ...2-(5-ethyl-2-pyridyl)... --

Column 27,
Line 21, should read -- The method of claim 22 wherein... --

Column 28,
Line 37, should read as follows -- ...2-benzimidazolone, 4,5,6... --
Line 38, add hyphen as follow -- ...2-(5-ethyl-2-pyridyl)... --

Signed and Sealed this

Twenty-sixth Day of April, 2005

JON W. DUDAS
*Director of the United States Patent and Trademark Office*